(12) United States Patent
Yin et al.

(10) Patent No.: US 10,601,926 B2
(45) Date of Patent: Mar. 24, 2020

(54) USER TERMINAL GROUPING METHOD, CONFERENCE SERVER, AND CONFERENCE SYSTEM

(71) Applicant: Huawei Technologies Co., Ltd., Shenzhen (CN)

(72) Inventors: Yu Yin, Nanjing (CN); Yifeng Ying, Hangzhou (CN); Dongxue Shi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 332 days.

(21) Appl. No.: 15/255,751

(22) Filed: Sep. 2, 2016

(65) Prior Publication Data

US 2016/0373531 A1 Dec. 22, 2016

Related U.S. Application Data

(63) Continuation of application No. PCT/CN2014/090791, filed on Nov. 11, 2014.

(30) Foreign Application Priority Data

Mar. 5, 2014 (CN) .......................... 2014 1 0078876

(51) Int. Cl.
*H04L 29/08* (2006.01)
*H04L 12/18* (2006.01)
(Continued)

(52) U.S. Cl.
CPC .......... *H04L 67/14* (2013.01); *H04L 12/1822* (2013.01); *H04L 51/10* (2013.01); *H04M 1/72519* (2013.01)

(58) Field of Classification Search
CPC ..... H04L 67/14; H04L 51/10; H04L 12/1822; H04M 1/72519
See application file for complete search history.

(56) References Cited

U.S. PATENT DOCUMENTS 5,894,305 A * 4/1999 Needham ............ H04L 12/1822
                                                            709/220
9,038,126 B2 * 5/2015 Ooki ..................... G06F 21/316
                                                            726/1
(Continued)

FOREIGN PATENT DOCUMENTS

CN          101194443 A      6/2008
CN          101364883 A      2/2009
(Continued)

OTHER PUBLICATIONS

Machine Translation and Abstract of Chinese Publication No. CN102469409, May 23, 2012, 14 pages.
(Continued)

*Primary Examiner* — Angela Nguyen
(74) *Attorney, Agent, or Firm* — Conley Rose, P.C.

(57) ABSTRACT

A user terminal grouping method, including receiving a conference participation request sent by a first user terminal, acquiring an identity code of a user of the first user terminal from the conference participation request, involving the first user terminal in a conference, comparing the identity code with identity codes corresponding to other user terminals that participate in the conference, determining that a second user terminal among the other user terminals and the first user terminal correspond to the same identity code, and sending, to a user terminal of another user in the conference, description information used to indicate that both the first user terminal and the second user terminal belong to the same user.

18 Claims, 6 Drawing Sheets

(51) Int. Cl.
*H04L 12/58* (2006.01)
*H04M 1/725* (2006.01)

(56) References Cited

U.S. PATENT DOCUMENTS

| | | |
|---|---|---|
| 2006/0167997 A1 | 7/2006 | Forstadius |
| 2009/0221307 A1 | 9/2009 | Wolak et al. |
| 2010/0057853 A1 | 3/2010 | Xu et al. |
| 2010/0189244 A1* | 7/2010 | Sastry ............... H04M 3/56 379/202.01 |
| 2010/0189260 A1 | 7/2010 | Ramanathan et al. |
| 2011/0270609 A1* | 11/2011 | Jones ............... H04M 3/56 704/235 |
| 2012/0066753 A1* | 3/2012 | Pan ............... G06F 21/40 726/7 |
| 2013/0086487 A1* | 4/2013 | Findlay ............... H04N 7/15 715/753 |
| 2014/0025740 A1* | 1/2014 | Jaudon ............... H04L 65/403 709/204 |
| 2014/0075377 A1* | 3/2014 | Kang ............... G06F 3/04842 715/788 |
| 2014/0195682 A1 | 7/2014 | Chen et al. |
| 2014/0351721 A1* | 11/2014 | DeLuca ............... G06F 17/30905 715/760 |
| 2015/0117626 A1* | 4/2015 | Nord ............... H04M 3/568 379/202.01 |
| 2015/0149585 A1* | 5/2015 | Zhang ............... G06Q 10/10 709/217 |
| 2015/0207794 A1* | 7/2015 | Lee ............... H04L 61/1541 709/225 |
| 2017/0115855 A1* | 4/2017 | Farouki ............... H04L 12/1822 |

FOREIGN PATENT DOCUMENTS

| | | |
|---|---|---|
| CN | 101394294 A | 3/2009 |
| CN | 101766011 A | 6/2010 |
| CN | 101917586 A | 12/2010 |
| CN | 102413128 A | 4/2012 |
| CN | 102469409 A | 5/2012 |
| CN | 103259770 A | 8/2013 |
| CN | 103369292 A | 10/2013 |
| EP | 2040494 B1 | 11/2012 |
| GB | 2500399 A | 9/2013 |
| WO | 2013140141 A1 | 9/2013 |

OTHER PUBLICATIONS

Foreign Communication From a Counterpart Application, Chinese Application No. 201410078876.8, Chinese Notice of Allowance dated Apr. 24, 2018, 4 pages.
Foreign Communication From a Counterpart Application, European Application No. 14684626.4, Extended European Search Report dated Jan. 12, 2017, 8 pages.
Foreign Communication From a Counterpart Application, PCT Application No. PCT/CN2014/090791, English Translation of International Search Report dated Feb. 25, 2015, 2 pages.
Foreign Communication From a Counterpart Application, PCT Application No. PCT/CN2014/090791, English Translation of Written Opinion dated Feb. 25, 2015, 5 pages.
Machine Translation and Abstract of Chinese Publication No. CN101917586, Dec. 15, 2010, 22 pages.
Machine Translation and Abstract of Chinese Publication No. CN102413128, Apr. 11, 2012, 11 pages.
Foreign Communication From a Counterpart Application, Chinese Application No. 201410078876.8, Chinese Office Action dated Sep. 21, 2017, 6 pages.

* cited by examiner

USER TERMINAL GROUPING METHOD, CONFERENCE SERVER, AND CONFERENCE SYSTEM

CROSS-REFERENCE TO RELATED APPLICATIONS

This application is a continuation of international patent application number PCT/CN2014/090791 filed on Nov. 11, 2014, which claims priority to Chinese patent application number 201410078876.8 filed on Mar. 5, 2014, both of which are incorporated by reference.

TECHNICAL FIELD

The present disclosure relates to the field of communications technologies, and in particular, to a user terminal grouping method, a conference server, and a conference system.

BACKGROUND

Figure 1:
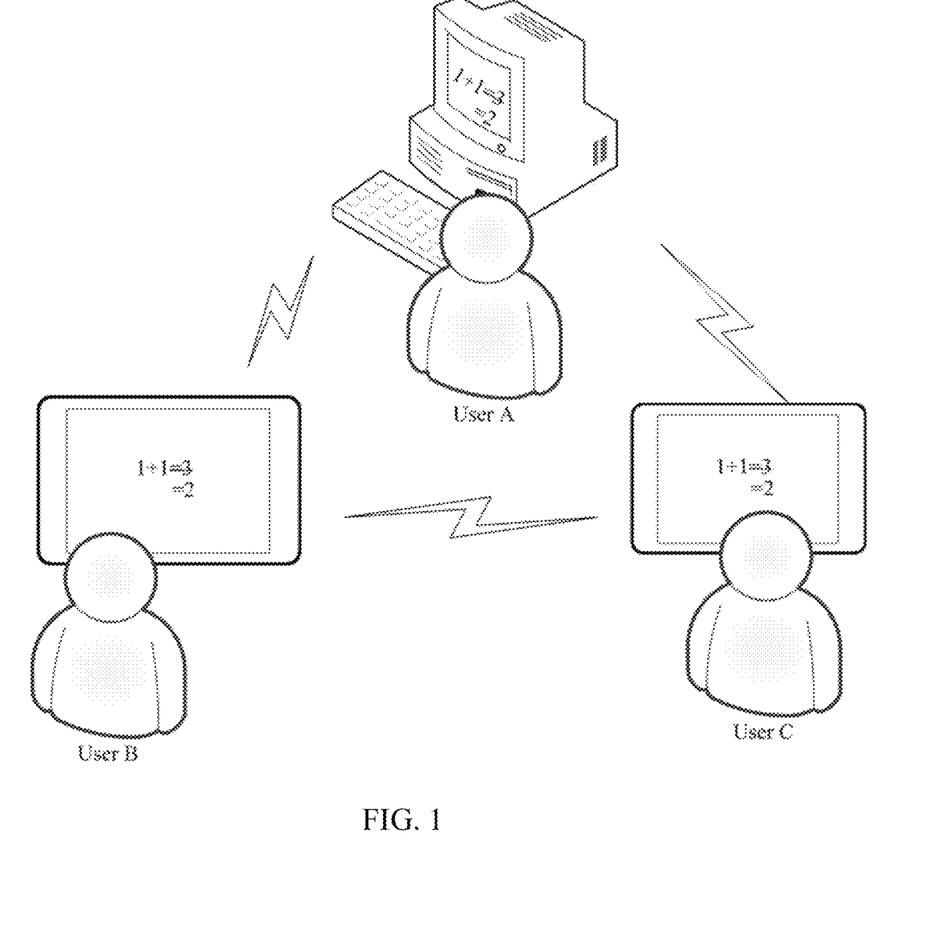
FIG. 1 is a schematic diagram that shows multiple users holding a same conference.

Currently, as communications technologies develop rapidly, users at different places can still hold a same network conference using terminals. For example, FIG. 1 is a schematic diagram that shows multiple users holding a same conference. In this case, three users, that is, a user A, a user B, and a user C participate in the conference. The user A uses a personal computer (PC) terminal, the user B uses a tablet computer (PAD) terminal, and the user C uses another PAD terminal. The three users use respective user terminals to discuss a problem in the same conference. Each user terminal has a specified sharing window, an activity (drawing, annotating, or the like) of any user that participates in the conference can be transmitted to a sharing window of another user in real time such that same content is presented on the three user terminals.

However, a same user can only use one terminal to participate in a conference. If a same user uses different user terminals to participate in a conference, for example, while using a PC terminal to participate in a conference, the user A uses another PAD terminal to participate in the conference, another user terminal in the conference considers that the newly participating PAD terminal and the PC terminal used by the user A belong to two different users.

SUMMARY

The present disclosure provides a user terminal grouping method, a conference server, and a conference system in order to resolve a technical problem in the prior art that user terminals belonging to a same user in a conference cannot be identified.

According to a first aspect of the present disclosure, a user terminal grouping method is described. The method is applied to a conference server, and the method includes receiving a conference participation request sent by a first user terminal, acquiring an identity code of a user of the first user terminal from the conference participation request, and involving the first user terminal in a conference, comparing the identity code with identity codes corresponding to other user terminals that participate in the conference, determining that the first user terminal and the second user terminal are terminals of the same user if it is determined, according to a comparison result, that a second user terminal among the other user terminals in the conference and the first user terminal correspond to the same identity code, and sending, to a user terminal of another user in the conference, description information used to indicate that both the first user terminal and the second user terminal belong to the user such that the user terminal of the other user in the conference identifies, according to the description information, both data sent by the first user terminal and data sent by the second user terminal that are received, as data sent by the user.

With reference to the first aspect, in a first possible implementation manner, after determining that the first user terminal and the second user terminal are terminals of the same user, the method further includes receiving a sharing request sent by the second user terminal, where the sharing request carries a terminal identifier and a sharing type of the first user terminal, and the sharing type is determined by the second user terminal according to a terminal capability of the first user terminal, and instructing, according to the sharing request, the first user terminal to perform data sharing specified by the sharing type.

With reference to the first possible implementation manner, in a second possible implementation manner, the conference participation request further includes a terminal type of the first user terminal, and before receiving a sharing request sent by the second user terminal, the method further includes sending the terminal identifier of the first user terminal and the terminal type of the first user terminal to the second user terminal such that the second user terminal determines the terminal capability of the first user terminal according to the terminal type of the first user terminal.

With reference to the first possible implementation manner, in a third possible implementation manner, the conference participation request further includes the terminal capability of the first user terminal, and before receiving a sharing request sent by the second user terminal, the method further includes sending the terminal identifier of the first user terminal and the terminal capability of the first user terminal to the second user terminal.

With reference to the first possible implementation manner, the second possible implementation manner, or the third possible implementation manner, in a fourth possible implementation manner, the terminal capability of the first user terminal includes a whiteboard sharing capability. The sharing type is determined according to the whiteboard sharing capability, and the sharing type is whiteboard sharing, and instructing the first user terminal to perform data sharing specified by the sharing type includes instructing the first user terminal to perform whiteboard sharing.

With reference to the fourth possible implementation manner, in a fifth possible implementation manner, before receiving a sharing request sent by the second user terminal, the method further includes receiving first whiteboard sharing data sent by the second user terminal, sending the first whiteboard sharing data to the first user terminal, and sending the first whiteboard sharing data to the user terminal of the other user in the conference such that the user terminal of the other user in the conference identifies, according to the description information, the first whiteboard sharing data as whiteboard sharing data sent by the user, and after instructing the first user terminal to perform data sharing specified by the sharing type, the method further includes receiving second whiteboard sharing data sent by the first user terminal, and sending the second whiteboard sharing data to the second user terminal such that the second user terminal displays the first whiteboard sharing data and the second whiteboard sharing data together, and sending the second whiteboard sharing data to the user terminal of the other user in the conference such that the user terminal of the other user in the conference displays the first whiteboard sharing data and the second whiteboard sharing data together, and identifies, according to the description information, the whiteboard sharing data displayed together, as whiteboard sharing data sent by the user.

With reference to the first possible implementation manner, the second possible implementation manner, or the third possible implementation manner, in a sixth possible implementation manner, the capability of the first user terminal includes a camera capability. The sharing type is determined according to the camera capability, and the sharing type is video sharing, and instructing the first user terminal to perform data sharing specified by the sharing type includes instructing the first user terminal to perform video sharing.

With reference to the sixth possible implementation manner, in a seventh possible implementation manner, before receiving a sharing request sent by the second user terminal, the method further includes receiving first video sharing data sent by the second user terminal, sending the first video sharing data to the first user terminal, and sending the first video sharing data to the user terminal of the other user in the conference such that the user terminal of the other user in the conference identifies, according to the description information, the first video sharing data as video sharing data sent by the user, and after instructing the first user terminal to perform data sharing specified by the sharing type, the method further includes receiving second video sharing data sent by the first user terminal, and sending the second video sharing data to the second user terminal, and sending the second video sharing data to the user terminal of the other user in the conference such that the user terminal of the other user in the conference identifies, according to the description information, the second video sharing data as video sharing data sent by the user.

According to a second aspect of the present disclosure, a conference server is described, and includes a receiving unit configured to receive a conference participation request sent by a first user terminal, acquire an identity code of a user of the first user terminal from the conference participation request, and involve the first user terminal in a conference, a comparison unit configured to compare the identity code received by the receiving unit with identity codes corresponding to other user terminals that participate in the conference, a processing unit configured to determine that the first user terminal and a second user terminal are terminals of the same user if the comparison unit determines, according to a comparison result, that the second user terminal among the other user terminals in the conference and the first user terminal correspond to the same identity code, and a sending unit configured to send description information that is used to indicate that both the first user terminal and the second user terminal belong to the user and that is determined by the processing unit to a user terminal of another user in the conference such that the user terminal of the other user in the conference identifies, according to the description information, both data sent by the first user terminal and data sent by the second user terminal that are received, as data sent by the user.

With reference to the second aspect, in a first possible implementation manner, the receiving unit is further configured to receive a sharing request sent by the second user terminal after the processing unit determines that the first user terminal and the second user terminal are terminals of the same user, where the sharing request carries a terminal identifier and the sharing type of the first user terminal, and the sharing type is determined by the second user terminal according to a terminal capability of the first user terminal, and the conference server further includes an instruction unit configured to instruct, according to the sharing request received by the receiving unit, the first user terminal to perform data sharing specified by the sharing type.

With reference to the first possible implementation manner, in a second possible implementation manner, the conference participation request further includes a terminal type of the first user terminal, and the sending unit is further configured to send the terminal identifier of the first user terminal and the terminal type of the first user terminal to the second user terminal before the receiving unit receives the sharing request sent by the second user terminal such that the second user terminal determines the terminal capability of the first user terminal according to the terminal type of the first user terminal.

With reference to the first possible implementation manner, in a third possible implementation manner, the conference participation request further includes the terminal capability of the first user terminal, and the sending unit is further configured to send the terminal identifier of the first user terminal and the terminal capability of the first user terminal to the second user terminal before the receiving unit receives the sharing request sent by the second user terminal.

With reference to the first possible implementation manner, the second possible implementation manner, or the third possible implementation manner, in a fourth possible implementation manner, the terminal capability of the first user terminal includes a whiteboard sharing capability. The sharing type is determined according to the whiteboard sharing capability, and the sharing type is whiteboard sharing, and the instruction unit is further configured to instruct the first user terminal to perform whiteboard sharing.

With reference to the fourth possible implementation manner, in a fifth possible implementation manner, before receiving the sharing request sent by the second user terminal, the receiving unit is further configured to receive first whiteboard sharing data sent by the second user terminal, send the first whiteboard sharing data to the first user terminal, and send the first whiteboard sharing data to the user terminal of the other user in the conference such that the user terminal of the other user in the conference identifies, according to the description information, the first whiteboard sharing data as whiteboard sharing data sent by the user. The receiving unit is further configured to receive second whiteboard sharing data sent by the first user terminal after the instruction unit instructs the first user terminal to perform data sharing specified by the sharing type, and the sending unit is further configured to send the second whiteboard sharing data received by the receiving unit to the second user terminal such that the second user terminal displays the first whiteboard sharing data and the second whiteboard sharing data together, and send the second whiteboard sharing data to the user terminal of the other user in the conference such that the user terminal of the other user in the conference displays the first whiteboard sharing data and the second whiteboard sharing data together, and identifies, according to the description information, the whiteboard sharing data displayed together, as whiteboard sharing data sent by the user.

With reference to the first possible implementation manner, the second possible implementation manner, or the third possible implementation manner, in a sixth possible implementation manner, the capability of the first user terminal includes a camera capability. The sharing type is determined according to the camera capability, and the sharing type is video sharing, and the instruction unit is further configured to instruct the first user terminal to perform video sharing.

With reference to the sixth possible implementation manner, in a seventh possible implementation manner, before receiving the sharing request sent by the second user terminal, the receiving unit is further configured to receive first video sharing data sent by the second user terminal, send the first video sharing data to the first user terminal, and send the first video sharing data to the user terminal of the other user in the conference such that the user terminal of the other user in the conference identifies, according to the description information, the first video sharing data as video sharing data sent by the user. The receiving unit is further configured to receive second video sharing data sent by the first user terminal after the instruction unit instructs the first user terminal to perform data sharing specified by the sharing type, and the sending unit is further configured to send the second video sharing data received by the receiving unit to the second user terminal, and send the second video sharing data to the user terminal of the other user in the conference such that the user terminal of the other user in the conference identifies, according to the description information, the second video sharing data as video sharing data sent by the user.

According to a third aspect of the present disclosure, a conference system is described, and includes a first user terminal configured to send a conference participation request, where the conference participation request carries an identity code of a user of the first user terminal, and a conference server configured to receive the conference participation request, acquire the identity code of the user of the first user terminal from the conference participation request, and involve the first user terminal in a conference, compare the identity code with identity codes corresponding to other user terminals that participate in the conference, determine that the first user terminal and a second user terminal are terminals of the same user if it is determined, according to a comparison result, that the second user terminal among the other user terminals in the conference and the first user terminal correspond to the same identity code, and send, to a user terminal of another user in the conference, description information used to indicate that both the first user terminal and the second user terminal belong to the user such that the user terminal of the other user in the conference identifies, according to the description information, both data sent by the first user terminal and data sent by the second user terminal that are received, as data sent by the user.

With reference to the third aspect, in a first possible implementation manner, the system further includes the second user terminal configured to send a sharing request after the conference server determines that the first user terminal and the second user terminal are terminals of the same user, where the sharing request carries a terminal identifier and a sharing type of the first user terminal, and the sharing type is determined by the second user terminal according to a terminal capability of the first user terminal, where the conference server is further configured to instruct, according to the sharing request sent by the second user terminal, the first user terminal to perform data sharing specified by the sharing type.

With reference to the first possible implementation manner, in a second possible implementation manner, the conference participation request further includes a terminal type of the first user terminal. The conference server is further configured to send the terminal identifier of the first user terminal and the terminal type of the first user terminal to the second user terminal before receiving the sharing request sent by the second user terminal, and the second user terminal is further configured to determine the terminal capability of the first user terminal according to the terminal type of the first user terminal.

With reference to the first possible implementation manner, in a third possible implementation manner, the conference participation request further includes the terminal capability of the first user terminal, and the conference server is further configured to send the terminal identifier of the first user terminal and the terminal capability of the first user terminal to the second user terminal before receiving the sharing request sent by the second user terminal.

With reference to the first possible implementation manner, the second possible implementation manner, or the third possible implementation manner, in a fourth possible implementation manner, the terminal capability of the first user terminal includes a whiteboard sharing capability. The sharing type is determined according to the whiteboard sharing capability, and the sharing type is whiteboard sharing, and the conference server is further configured to instruct the first user terminal to perform whiteboard sharing.

With reference to the first possible implementation manner, the second possible implementation manner, or the third possible implementation manner, in a fifth possible implementation manner, the capability of the first user terminal includes a camera capability. The sharing type is determined according to the camera capability, and the sharing type is video sharing, and the conference server is configured to instruct the first user terminal to perform video sharing.

One or more technical solutions of the foregoing technical solutions have the following technical effects or advantages.

In the technical solutions of the present disclosure, an identity code of a first user terminal is acquired first, and then the identity code is compared with identity codes of other user terminals in a conference. If a second user terminal among the other user terminals in the conference and the first user terminal have the same identity code, it is determined that the first user terminal and the second user terminal are user terminals of a same user, and description information that "the first user terminal and the second user terminal belong to the same user" is sent to a user terminal of another user in the conference. The user terminal of the other user in the conference can identify the first user terminal and the second user terminal as user terminals used by the same user after receiving the description information. Therefore, in the present disclosure, it is mainly determined that user terminals having a same identity code are user terminals of a same user, and description information that the user terminals having the same identity code belong to the same user is sent to a user terminal of another user in a conference. Therefore, the user terminal of the other user in the conference can identify the user terminals having the same identity code, as user terminals used by the same user.

DESCRIPTION OF EMBODIMENTS

To resolve a technical problem in the prior art that user terminals belonging to a same user in a conference cannot be identified, embodiments of the present disclosure provide a user terminal grouping method, a conference server, and a conference system. The following describes technical solutions of the present disclosure in detail using accompanying drawings and specific embodiments. It should be understood that, the embodiments of the present disclosure and specific characteristics in the embodiments are intended to describe the technical solutions of the present disclosure in detail rather than limit the technical solutions of the present disclosure. On condition that no conflict is caused, the embodiments of the present disclosure and the technical characteristics in the embodiments may be combined with each other.

In a first embodiment of the present disclosure, a user terminal grouping method is described, and the method is applied to a conference server.

Figure 2:
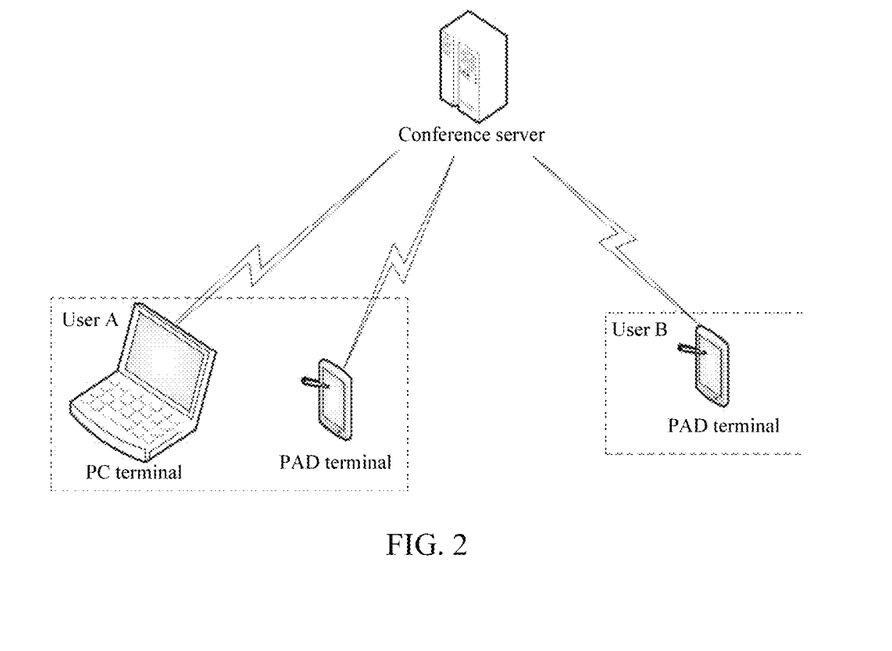
FIG. 2 is an overall architectural diagram of a user terminal grouping method according to an embodiment of the present disclosure.

Referring to FIG. 2, the following first describes an application scenario of the method from the perspective of an overall architecture. FIG. 2 is an example of an overall architectural diagram of a user terminal grouping method.

In FIG. 2, several parts are described a conference server, a PC terminal and a PAD terminal that are used by a user A, and a PAD terminal used by a user B. The conference server is used to maintain and forward conference data, maintain a participant list, maintain a user group, maintain whiteboard editing rights, and so on. The PC terminal and the PAD terminal of the user A are grouped into a same group. The user A participates in a conference using the PC terminal, and may perform whiteboard sharing or video sharing (if the PC terminal has a camera) using the PC terminal. The user B participates in the conference using the PAD terminal, and may perform whiteboard sharing or video sharing using the PAD terminal.

Whiteboard sharing is used as an example, and in a same conference, all participating users can communicate in real time by means of whiteboard sharing, where the whiteboard sharing refers that in a same conference, users at different places can discuss a problem on a "common" whiteboard, and an activity (drawing, annotating, or the like) of any participating user can be transmitted to a whiteboard of another user in real time, and interaction and communication can be implemented by performing an operating on a whiteboard interface using a finger or a mouse. As shown in FIG. 2, assuming that the user A and the user B are in a same conference, a "common" whiteboard is displayed on both the PC terminal of the user A and the PAD terminal of the user B, and these users can discuss a problem on this "common" whiteboard. If the user A modifies data on the PC terminal, modified data can be transmitted to the PAD terminal of the user B in real time such that same content is presented on the two terminals. However, the PC terminal requests the conference server to "instruct the PAD terminal to perform whiteboard sharing", after the PC terminal of the user A and the PAD terminal of the user A are grouped into a same group, and if the PC terminal has learned a whiteboard sharing capability of the PAD terminal and discovers that a whiteboard sharing capability of the PC terminal is insufficient, where whiteboard sharing is determined by the PC terminal according to the whiteboard sharing capability of the PAD terminal. It should be noted that, to describe and explain the present disclosure, an overall architecture is described using a PAD terminal and a PC terminal as examples, however, in an actual case, for example, a user may participate in a conference using another user terminal (such as a mobile phone terminal), and a type of a terminal used by a user is not limited in the present disclosure.

Figure 3:
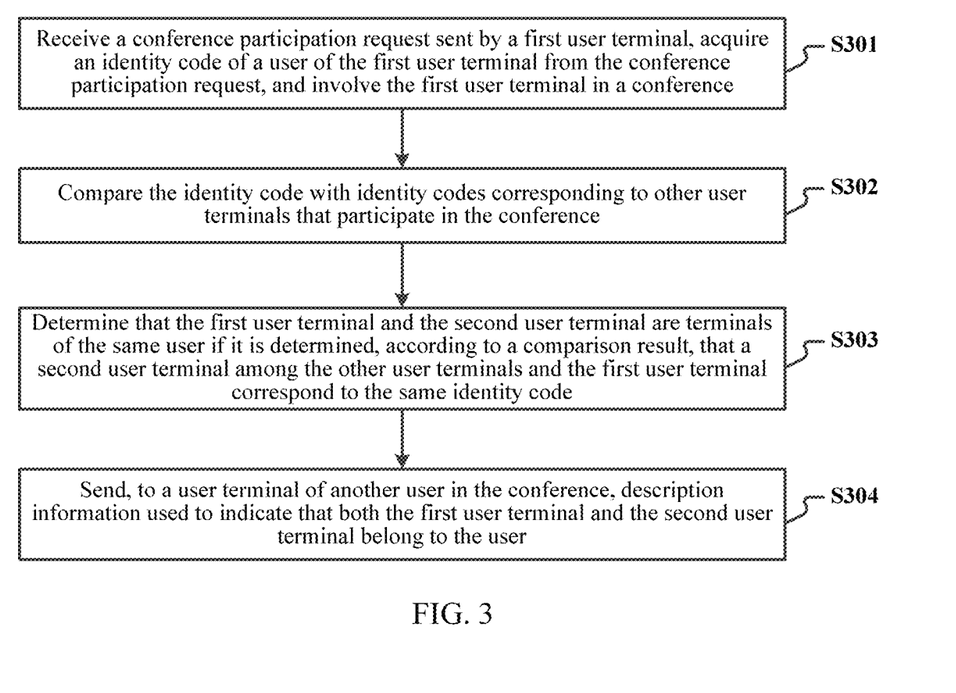
FIG. 3 is a process diagram of a user terminal grouping method according to an embodiment of the present disclosure.

With reference to FIG. 2 and FIG. 3, the following further describes how a conference server groups user terminals. FIG. 3 describes a process diagram of a user terminal grouping method according to an embodiment of the present disclosure from a conference server side, and a specific implementation process is as follows.

Step S301: Receive a conference participation request sent by a first user terminal, acquire an identity code of a user of the first user terminal from the conference participation request, and involve the first user terminal in a conference.

In a specific implementation process, the first user terminal may further be a PC terminal, a PAD terminal, a mobile phone terminal, or the like. With reference to the architectural diagram in FIG. 2, the first user terminal in this case is the PAD terminal used by the user A. For convenience of description, "PAD terminal" that appears in the following embodiments all refers to the PAD terminal used by the user A, and the PAD terminal used by the user B is described by directly using a name of "the PAD terminal of the user B". The identity code is used to identify a user identity of the user A, and may be user_ID. After it is confirmed that the first user terminal participates in the conference, a notification message is further sent to the first user terminal, to notify the first user terminal of a conference participation success, and a terminal identifier is allocated to the first user terminal, to uniquely identify the first user terminal. The terminal identifier in this case includes but is not limited to a letter, a number, a character string, or the like.

Step S302: Compare the identity code with identity codes corresponding to other user terminals that participate in the conference.

In a specific implementation process, each user terminal has a respective identity code, used to identify a user identity of a corresponding user. Different terminals of a same user have a same identity code. Therefore, after the identity code of the first user terminal is obtained, the identity code of the first user terminal is compared with the identity codes corresponding to the other user terminals that participate in the conference (the identity codes corresponding to the other user terminals are acquired from conference participation requests sent by the other user terminals) in order to search for a user terminal that has an identity code that is the same as that of the first user terminal. For example, with reference to FIG. 2, the conference server acquires an identification (ID) of the PAD terminal when the PAD terminal participates in the conference, and then compares the ID with IDs of other user terminals (the PC terminal used by the user A and the PAD terminal used by the user B). Both the PAD terminal and the PC terminal belong to the user A, and therefore, the two have a same ID. Therefore, after the comparison, the following result may be obtained: the PAD terminal and the PC terminal have the same ID.

Step S303: Determine that the first user terminal and a second user terminal are terminals of the same user if it is determined, according to a comparison result, that the second user terminal among the other user terminals and the first user terminal correspond to the same identity code.

In a specific implementation process, for example, still with reference to FIG. 2, it is determined that the PAD terminal and the PC terminal are terminals of the same user (that is, the user A) when it is determined, according to the comparison result, that the PAD terminal and the PC terminal have the same ID. The PC terminal in this case is the second user terminal. In an actual case, the second user terminal may be a PC terminal, a PAD terminal, a mobile phone terminal, or the like, and the second user terminal is not limited in the present disclosure. In addition, the conference server may further establish "a mapping relationship between a user and a terminal". The user A is used as an example; referring to Table 1, the mapping relationship includes a user name of the user A, a quantity of terminals owned by the user A, an identity code of the user A, and respective terminal identifiers and respective terminal types of the first user terminal and the second user terminal.

TABLE 1

| User name: user A |
| Quantity of terminals: two |
| Identity code: user_ID |

| Terminal identifier of the first user terminal: 1 | Terminal identifier of the second user terminal: 2 |
| Terminal type of the first user terminal: PAD | Terminal type of the second user terminal: PC |

S304: Send, to a user terminal of another user in the conference, description information used to indicate that both the first user terminal and the second user terminal belong to the user. The description information is sent to the user terminal of the other user in the conference such that the user terminal of the other user in the conference identifies, according to the description information, both data sent by the first user terminal and data sent by the second user terminal that are received, as data sent by the same user.

For example, still with reference to FIG. 2, the conference server notifies the PAD terminal of the user B of the description information that "both the PAD terminal and the PC terminal belong to the user A" after determining that the PAD terminal and the PC terminal are terminals of the same user (that is, the user A). Hence, the PAD terminal of the user B identifies both data sent by the PAD terminal of the user A and data sent by the PC terminal of the user A as data sent by the user A. The description information may further be an association relationship between a terminal identifier of the PAD terminal and the identity code of the user A, and an association relationship between a terminal identifier of the PC terminal and the identity code of the user A.

The foregoing is the specific implementation process in which the conference server determines that the first user terminal and the second user terminal are terminals of a same user. For convenience of understanding, in this embodiment of the present disclosure, only a grouping case in which it is determined that two user terminals belong to a same user is described. However, in an actual case, the second user terminal may include multiple user terminals, that is, the present disclosure further includes a case in which it is determined that multiple user terminals belong to a same user. A difference between the two grouping cases lies only in a quantity of user terminals, and specific grouping processes are similar. Therefore, for the case in which it is determined that multiple user terminals belong to a same user, details are not described again in the present disclosure.

The following embodiment further describes an implementation process in which after the conference server determines that the first user terminal and the second user terminal are terminals of the same user, the user performs data sharing using the first user terminal and the second user terminal.

In a specific execution process, a sharing request sent by the second user terminal is received first, where the sharing request carries the terminal identifier and a sharing type of the first user terminal. Then the first user terminal is instructed, according to the sharing request, to perform data sharing specified by the sharing type.

In a specific implementation process, the terminal identifier of the first user terminal is allocated by the conference server after the conference server confirms that the first user terminal successfully participates in the conference, and is used to uniquely identify the first user terminal. In addition, the terminal identifier of the first user terminal includes but is not limited to a letter, a number, a character string, or the like. The sharing type is determined by the second user terminal according to a terminal capability of the first user terminal. The terminal capability of the first user terminal includes a whiteboard sharing capability and a camera capability. Therefore, the second user terminal must learn the terminal capability of the first user terminal in order to determine the sharing type before sending the sharing request. There are two implementation manners in which the second user terminal learns the terminal capability of the first user terminal. They are as follows.

The first manner: The conference server sends the terminal type of the first user terminal to the second user terminal such that the second user terminal determines the terminal capability of the first user terminal according to the terminal type.

In a specific implementation process, the first conference request further includes the terminal type of the first user terminal. The conference server sends the terminal identifier of the first user terminal and the terminal type of the first user terminal to the second user terminal before receiving the sharing request sent by the second user terminal such that the second user terminal determines the terminal capability of the first user terminal according to the terminal type. For example, still referring to FIG. 2, for the user A, the PC terminal can learn, according to a terminal type of the PAD terminal, that a terminal capability of the PAD terminal is the whiteboard sharing capability and the camera capability if the conference server sends the terminal type of the PAD terminal to the PC terminal.

The second manner: The conference server directly sends the terminal capability of the first user terminal to the second user terminal.

In a specific implementation process, the conference participation request further includes the terminal capability of the first user terminal. The conference server sends the identifier of the first user terminal and the terminal capability of the first user terminal to the second user terminal before receiving the sharing request sent by the second user terminal. For example, still referring to FIG. 2, for the user A, the conference server may directly notify the PC terminal of the terminal capability possessed by the PAD terminal, and then the PC terminal can directly learn that the terminal capability of the PAD terminal is the whiteboard sharing capability and the camera capability.

The following describes a specific implementation process of performing data sharing according to a terminal capability.

In a specific implementation process, the terminal capability of the first user terminal includes the whiteboard sharing capability, the camera capability, and the like. The following provides descriptions using the whiteboard sharing capability and the camera capability as examples.

The whiteboard sharing capability is used as an example.

Figure 4:
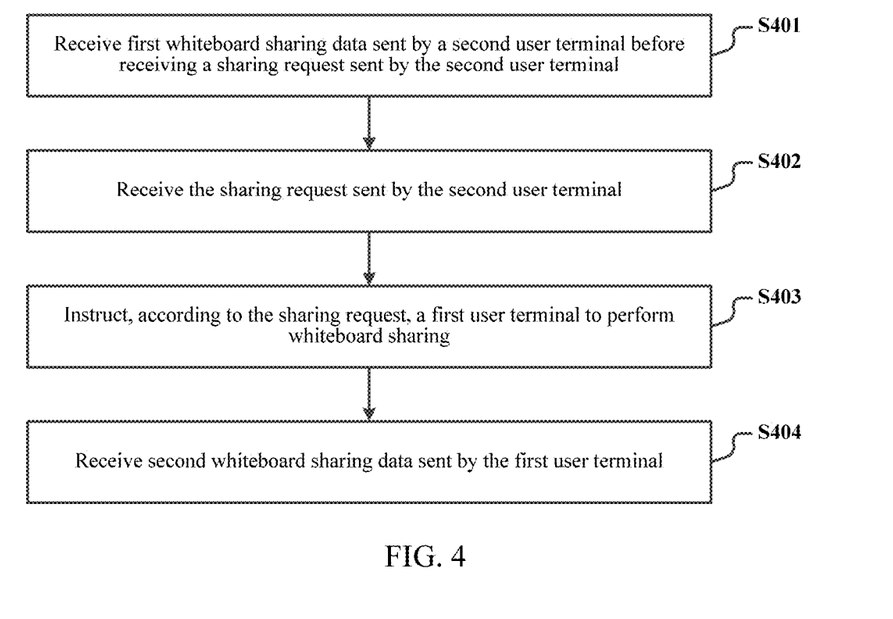
FIG. 4 is an implementation process diagram that shows whiteboard sharing of a first user terminal with reference to a second user terminal according to an embodiment of the present disclosure.

The terminal capability of the first user terminal includes the whiteboard sharing capability. Then the sharing type is determined according to the whiteboard sharing capability, and the sharing type is whiteboard sharing. In this case, instructing the first user terminal to perform data sharing specified by the sharing type further includes instructing the first user terminal to perform whiteboard sharing. In a specific implementation process, the conference server sends a message of "enabling a whiteboard editing right" to the first user terminal, to notify the first user terminal that the first user terminal has the whiteboard editing right and to allow the first user terminal to edit a whiteboard. In the following, referring to FIG. 4, FIG. 4 is an implementation process diagram that shows whiteboard sharing of a first user terminal with reference to a second user terminal according to an embodiment of the present disclosure.

Step S401: Receive first whiteboard sharing data sent by a second user terminal before receiving a sharing request sent by the second user terminal.

After the first whiteboard sharing data is received, the first whiteboard sharing data is sent to the first user terminal, and the first whiteboard sharing data is sent to the user terminal of the other user in the conference such that the user terminal of the other user in the conference identifies, according to the description information, the first whiteboard sharing data as whiteboard sharing data sent by the user.

Step S402: Receive the sharing request sent by the second user terminal.

The sharing request carries a terminal identifier and a sharing type of the first user terminal, and in this case, the sharing type is whiteboard sharing. The whiteboard sharing is determined according to the whiteboard sharing capability of the first user terminal.

Step S403: Instruct, according to the sharing request, the first user terminal to perform whiteboard sharing.

Step S404: Receive second whiteboard sharing data sent by the first user terminal.

After the second whiteboard sharing data is received, the second whiteboard sharing data is sent to the second user terminal such that the second user terminal displays the first whiteboard sharing data and the second whiteboard sharing data together, and the second whiteboard sharing data is sent to the user terminal of the other user in the conference such that the user terminal of the other user in the conference displays the first whiteboard sharing data and the second whiteboard sharing data together, and identifies, according to the description information, the whiteboard sharing data displayed together, as whiteboard sharing data sent by the user.

Furthermore, the following step may be further executed after step S404 is executed: disable a whiteboard editing right of the second user terminal, and send the second user terminal a prohibition message for prohibiting the second user terminal from performing whiteboard sharing, to notify the second user terminal that the whiteboard editing right of the second user terminal is disabled. However, in another embodiment, the conference server may also reserve the whiteboard editing right of the second user terminal, and then both the first user terminal and the second user terminal can edit a whiteboard.

For example, still referring to FIG. 2, for the user A, the first user terminal is a PAD terminal, and the second user terminal is a PC terminal. After the conference server confirms that both the PAD terminal and the PC terminal are terminals of the user A, as an example, the PAD terminal performs whiteboard sharing. For the conference server, the conference server receives first whiteboard sharing data sent by the PC terminal before receiving the sharing request sent by the PC terminal. The first whiteboard sharing data in this case may be, for example, a modification or an addition to original data on the whiteboard. A whiteboard sharing capability of the PC terminal is relatively weak, while a whiteboard sharing capability of the PAD terminal is strong and it is convenient for the PAD terminal to perform whiteboard sharing. Therefore, the PC terminal sends a sharing request to the conference server, where the sharing request carries a terminal identifier and whiteboard sharing of the PAD terminal, to request the conference server to allow the PAD terminal to perform whiteboard sharing. After receiving the sharing request, the conference server instructs, according to the sharing request, the PAD terminal to perform whiteboard sharing, and receives second whiteboard sharing data sent by the PAD terminal.

A camera sharing capability is used as an example.

A capability of the first user terminal includes a camera capability. Then the sharing type is determined according to the camera capability, and the sharing type is video sharing. In this case, instructing the first user terminal to perform data sharing specified by the sharing type further includes instructing the first user terminal to perform video sharing.

Figure 5:
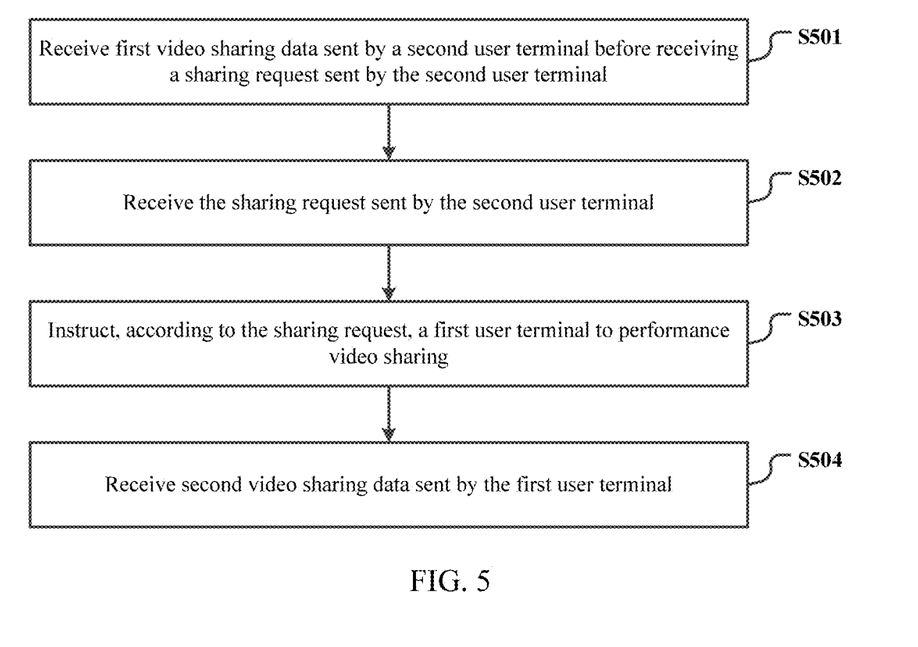
FIG. 5 is an implementation process diagram that shows video sharing of a first user terminal with reference to a second user terminal according to an embodiment of the present disclosure.

In the following, referring to FIG. 5, FIG. 5 is an implementation process diagram that shows video sharing of a first user terminal with reference to a second user terminal according to an embodiment of the present disclosure.

Step S501: Receive first video sharing data sent by a second user terminal before receiving the sharing request sent by the second user terminal.

The first video sharing data is sent to the first user terminal after the first video sharing data is received, and the first video sharing data is sent to the user terminal of the other user in the conference such that the user terminal of the other user in the conference identifies, according to the description information, the first video sharing data as video sharing data sent by the user.

Step S502: Receive the sharing request sent by the second user terminal.

The sharing request carries a terminal identifier and a sharing type of the first user terminal, and in this case, the sharing type is video sharing. The video sharing is determined according to a camera capability of the first user terminal.

Step S503: Instruct, according to the sharing request, the first user terminal to perform video sharing.

Step S504: Receive second video sharing data sent by the first user terminal.

After the second video sharing data is received, the second video sharing data is sent to the second user terminal, and the second video sharing data is sent to the user terminal of the other user in the conference such that the user terminal of the other user in the conference identifies, according to the description information, the second video sharing data as video sharing data sent by the user.

Furthermore, the following step may be further performed after step S504 is performed: disable a video right of the second user terminal, and send a prohibition message for prohibiting the second user terminal from performing video sharing to the second user terminal, to notify the second user terminal that the video right of the second user terminal is disabled. However, in another embodiment, the conference server may also reserve the video right of the second user terminal, and then both the first user terminal and the second user terminal can perform video sharing. For example, still referring to FIG. 2, for the user A, the first user terminal is a PAD terminal, and the second user terminal is a PC terminal. After the conference server confirms that both the PAD terminal and the PC terminal are terminals of the user A, as an example, the PAD terminal performs video sharing. The conference server receives first video sharing data sent by the PC terminal (if the PC terminal has a camera) before receiving the sharing request sent by the PC terminal. Because a video capability of the PC terminal is relatively weak, while a video capability of the PAD terminal is strong and it is convenient for the PAD terminal to perform video sharing. Therefore, the PC terminal sends a sharing request to the conference server, where the sharing request carries a terminal identifier and video sharing of the PAD terminal, to request the conference server to allow the PAD terminal to perform video sharing. After receiving the sharing request, the conference server instructs, according to the sharing request, the PAD terminal to perform video sharing, and receives the second video sharing data sent by the PAD terminal.

The embodiments of the whiteboard sharing and the video sharing indicate that the different terminals can provide different terminal capabilities for the user when multiple user terminals participate in a conference as user terminals of a same user. Therefore, the user can selectively operate the user terminals in the conference, thereby achieving an objective of implementing function sharing among multiple user terminals.

Figure 6A:
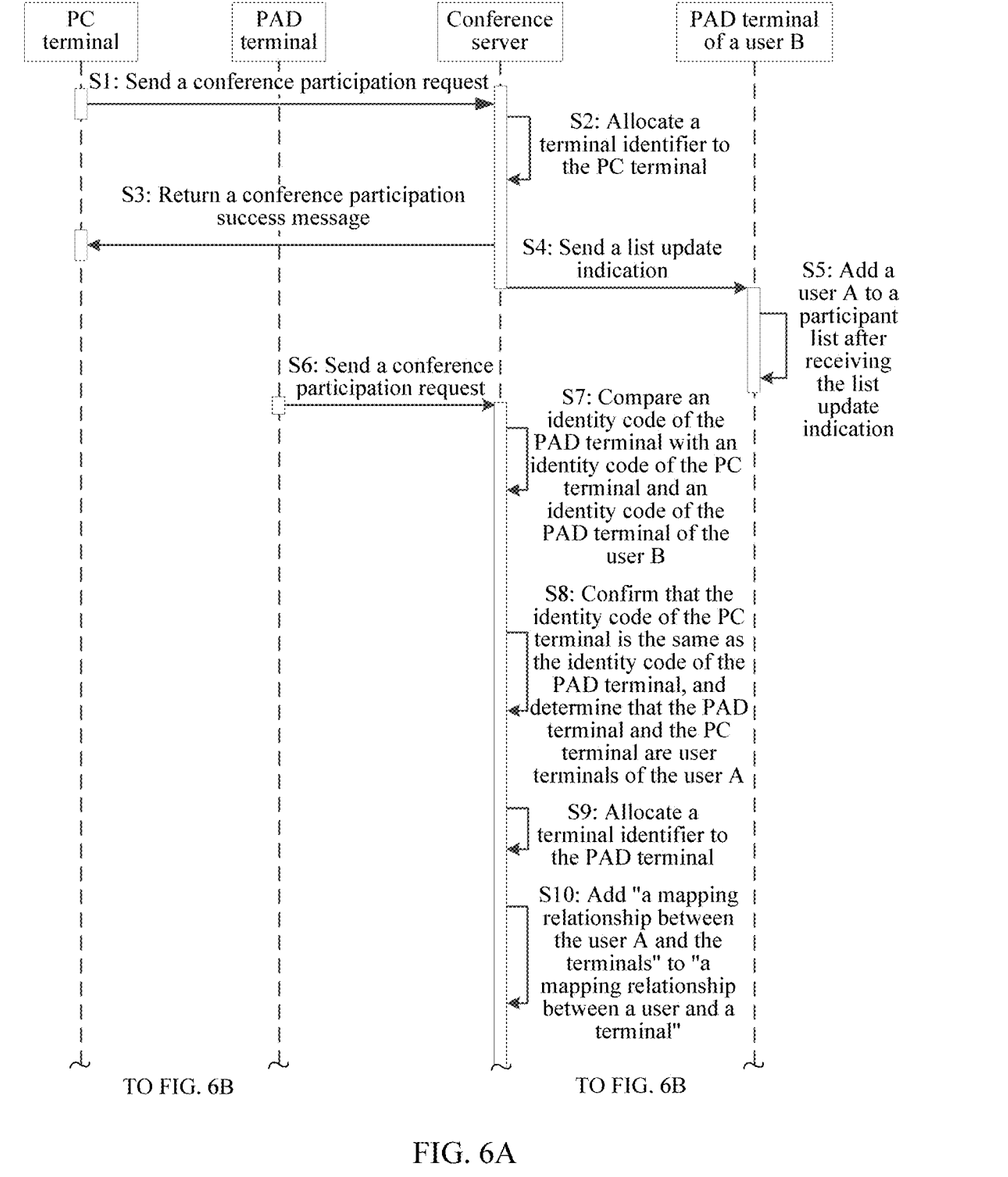
FIG. 6A and FIG. 6B are a flowchart showing multiple user terminals of a same user performing whiteboard sharing according to an embodiment of the present disclosure.
Figure 6B:
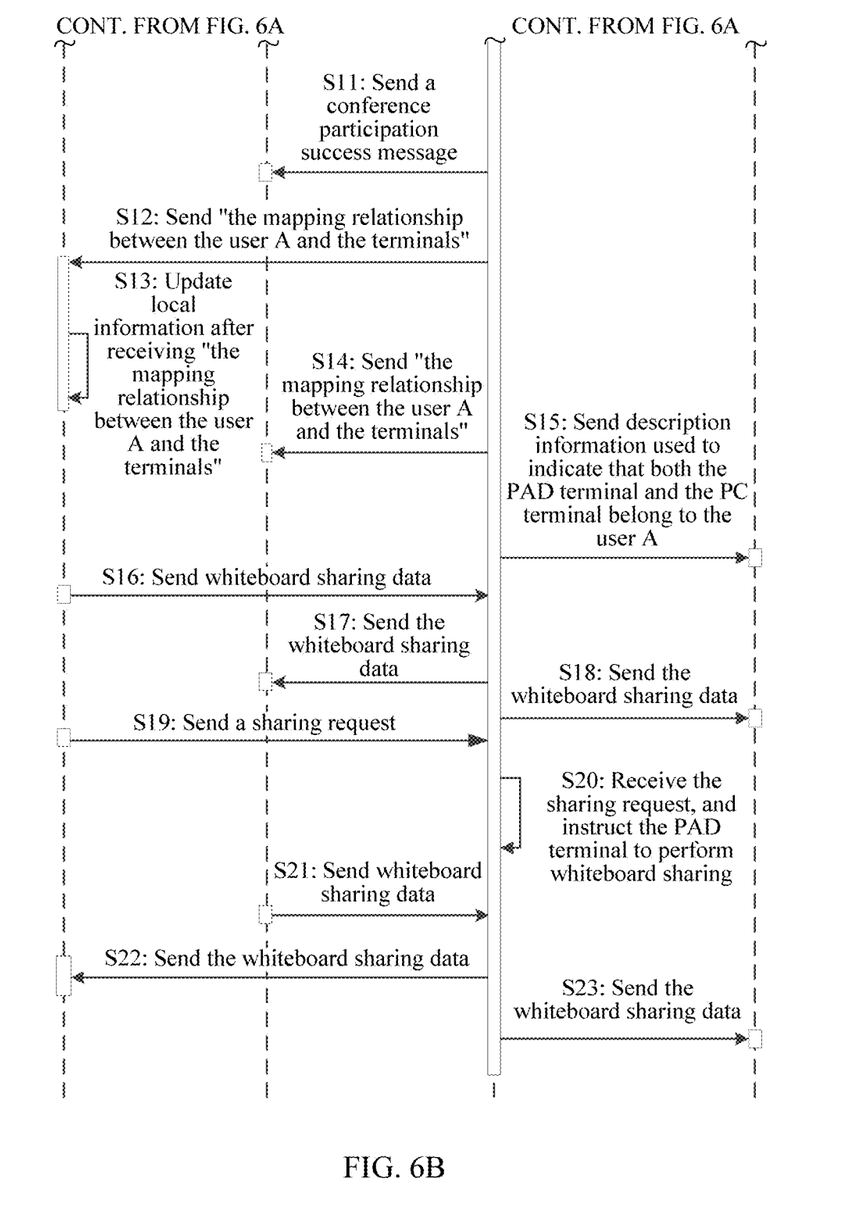

With reference to FIG. 2, FIG. 6A, and FIG. 6B, the following describes an implementation process of user terminal grouping and whiteboard sharing from the perspective of an overall architecture. FIG. 6A and FIG. 6B are a flowchart showing multiple user terminals of a same user performing whiteboard sharing according to an embodiment of the present disclosure. An implementation process of video sharing is similar to that of whiteboard sharing, and details are not described again in the present disclosure. As an example, the PAD terminal of the user A is used as a first user terminal in this case, and the PC terminal of the user A is used as a second user terminal and the implementation process includes the following steps.

Step S1: The PC terminal sends a conference participation request to a conference server. The conference participation request is used to request the conference server to allow the PC terminal to participate in a conference. The conference participation request carries a user_ID and a terminal type (PC) of the PC terminal. The user_ID is used to identify an identity of the user A. The user_ID may be acquired from multiple sources, for example, the user_ID is obtained from a browser, or the user_ID is acquired from an email link by means of parsing.

Step S2: The conference server receives the conference participation request sent by the PC terminal, and allocates a terminal identifier node_ID1 to the PC terminal, to uniquely identify the PC terminal.

Step S3: The conference server returns a conference participation success message to the PC terminal. The message includes the terminal identifier node_ID1 of the PC terminal.

Step S4: The conference server sends a list update indication to a user terminal of another user (that is, a PAD terminal of a user B) in the conference. The list update indication is used to instruct the user terminal of the other user in the conference to update a participant list.

Step S5: The PAD terminal of the user B adds the user A to the participant list after receiving the list update indication.

Step S6: The PAD terminal of the user A sends a conference participation request to the conference server. The conference participation request is used to request the conference server to allow the PAD terminal to participate in the conference. The conference participation request carries a user_ID and a terminal type (PAD) of the PAD terminal. The user_ID is used to identify the identity of the user A.

Step S7: The conference server receives the conference participation request sent by the PAD terminal, and compares an identity code user_ID of the PAD terminal with identity codes of other user terminals in the conference. In a process of the comparison, the identity code of the PAD terminal is compared with an identity code of the PC terminal and an identity code of the PAD terminal of the user B.

Step S8: The conference server confirms that the identity code of the PC terminal is the same as the identity code of the PAD terminal, and determines that the PAD terminal and the PC terminal are user terminals of the user A, that is, confirms that the PAD terminal and the PC terminal belong to the user A.

Step S9: The conference server allocates a terminal identifier node_ID2 to the PAD terminal, to uniquely identify the PAD terminal.

Step S10: The conference server adds "a mapping relationship between the user A and the terminals" to "a mapping relationship between a user and a terminal". For content of "the mapping relationship between the user A and the terminals", refer to Table 1.

Step S11: The conference server sends a conference participation success message to the PAD terminal, where the message includes the terminal identifier node_ID2 of the PAD terminal.

Step S12: The conference server sends "the mapping relationship between the user A and the terminals" to the PC terminal, to notify the PC terminal that a PAD client of the user A participates in the conference.

Figure 7:
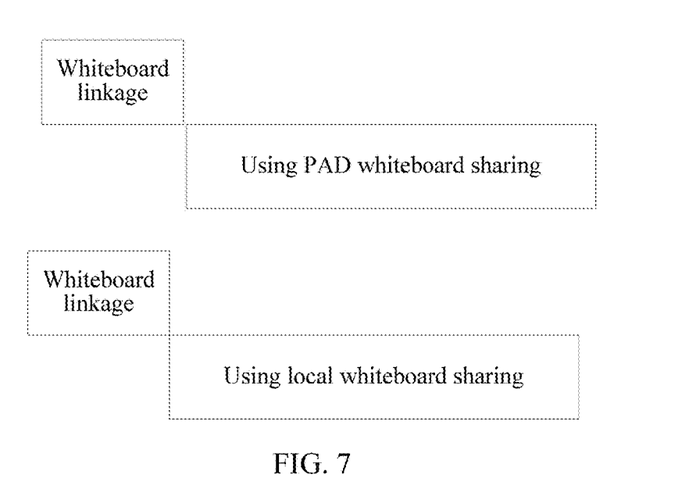
FIG. 7 is a schematic diagram of "whiteboard linkage" according to an embodiment of the present disclosure.

Step S13: The PC terminal updates local information after receiving "the mapping relationship between the user A and the terminals". As shown in FIG. 7, in this embodiment of the present disclosure, the PC terminal has a "whiteboard linkage" button. After the PC terminal updates the local information, a function of triggering the "whiteboard linkage" button is enabled. That is, the user A may further select "using PAD whiteboard sharing" when the user A clicks the button. After using the PAD whiteboard sharing, the user A may select, by clicking the button again, "using local whiteboard sharing", to switch back to a whiteboard sharing capability of the original terminal. The user A may click "whiteboard linkage" to select from the multiple user terminals if multiple user terminals of the user A participate in the conference.

In this embodiment of the present disclosure, different terminals of a same user are externally presented as one user. Only one terminal may have a whiteboard editing capability, or multiple terminals may have a whiteboard editing capability when there are multiple terminals. The first terminal that participates in the conference is considered as the first terminal that can edit a whiteboard of a same user, and subsequently the whiteboard linkage may be used to switch between the multiple terminals, to determine a whiteboard used for editing.

Step S14: The conference server sends "the mapping relationship between the user A and the terminals" to the PAD terminal. A processing process for the PAD terminal is similar to that for the PC terminal, and details are not described again herein.

Step S15: The conference server sends, to the PAD terminal of the user B, description information used to indicate that both the PAD terminal and the PC terminal belong to the user A. Based on this, the PAD terminal of the user B identifies both data sent by the PAD terminal and data sent by the PC terminal that are received, as data sent by the user A.

Step S16: The PC terminal sends whiteboard sharing data to the conference server. The sent whiteboard sharing data includes only currently edited data, and does not include original whiteboard sharing data. After receiving the whiteboard sharing data sent by the PC terminal, the conference server sends the whiteboard sharing data to other user terminals other than the PC terminal, including another terminal of the same user. For specific steps, refer to steps S17 and S18.

Step S17: The conference server sends the whiteboard sharing data to the PAD terminal.

Step S18: The conference server sends the whiteboard sharing data to the PAD terminal of the user B. After receiving the whiteboard sharing data, the two PAD terminals (the PAD terminal of the user A and the PAD terminal of the user B) draw the whiteboard sharing data on an original whiteboard.

Step S19: The PC terminal sends a sharing request. In a process of the conference, the user A successively clicks "whiteboard linkage" and "using PAD whiteboard sharing" on the PC terminal, to switch to the PAD terminal. In this case, the PC terminal receives the click by the user, and triggers the sending of the sharing request, to request the conference server to allow the user A to use the PAD whiteboard sharing. The sharing request carries the terminal identifier node_ID2 of the PAD terminal and the whiteboard sharing of the PAD terminal.

Step S20: The conference server receives the sharing request, and instructs a user terminal whose terminal identifier is the node_ID2 (that is, the PAD terminal) to perform whiteboard sharing. In a specific implementation process, a message of "enabling a whiteboard editing right" is sent to the PAD terminal, to allow the PAD terminal to edit the whiteboard. In addition, the conference server may further send a message of "disabling a whiteboard editing right" to the PC terminal, to notify the PC terminal that the PC terminal can only receive the whiteboard and cannot edit the whiteboard. Certainly, the conference server may not send this message, and in this case, both the PC terminal and the PAD terminal can edit the whiteboard.

Step S21: The PAD terminal sends whiteboard sharing data. The conference server receives the whiteboard sharing data sent by the PAD terminal. In this embodiment of the present disclosure, the conference server further sends the whiteboard sharing data to other user terminals other than the PAD terminal, including another terminal of the same user, to ensure data consistency among all terminals. However, in a process in which a user switches between user terminals using "whiteboard linkage", whiteboard sharing data of all terminals of the same user can be kept consistent, thereby implementing seamless switching of whiteboard sharing. In addition, regardless of which user terminal of the user A is used to perform whiteboard sharing, the PAD terminal of the user B identifies whiteboard sharing data sent by the user terminal as whiteboard sharing data sent by the user A.

Step S22: The conference server sends the whiteboard sharing data to the PC terminal.

Step S23: The conference server sends the whiteboard sharing data to the PAD terminal of the user B.

In the foregoing embodiment, it is determined that user terminals that have a same identity code are user terminals of a same user, and multiple terminals of different types can participate in a conference as user terminals of a same user. The terminals can provide different functions such that the user can selectively operate the terminals in the conference, thereby implementing function sharing among the multiple terminals, and increasing efficiency of the conference.

In a second embodiment of the present disclosure, based on a same inventive concept, a conference server is described.

Figure 8:
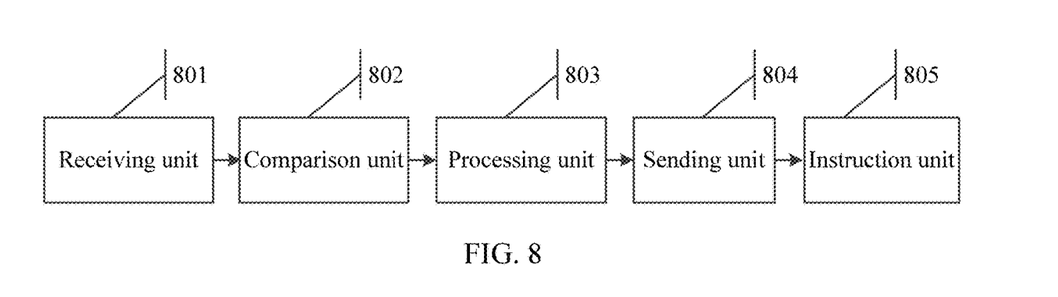
FIG. 8 is a schematic diagram of a conference server according to an embodiment of the present disclosure.

In the following, referring to FIG. 8, the conference server includes a receiving unit 801, a comparison unit 802, a processing unit 803, a sending unit 804, and an instruction unit 805.

The following describes specific functions of the functional units.

The receiving unit 801 is configured to receive a conference participation request sent by a first user terminal, acquire an identity code of a user of the first user terminal from the conference participation request, and involve the first user terminal in a conference.

The comparison unit 802 is configured to compare the identity code received by the receiving unit 801 with identity codes corresponding to other user terminals that participate in the conference.

The processing unit 803 is configured to determine that the first user terminal and a second user terminal are terminals of the same user if the comparison unit 802 determines, according to a comparison result, that the second user terminal among the other user terminals and the first user terminal correspond to the same identity code.

The sending unit 804 is configured to send description information that is used to indicate that both the first user terminal and the second user terminal belong to the user and that is determined by the processing unit 803 to a user terminal of another user in the conference such that the user terminal of the other user identifies, according to the description information, both data sent by the first user terminal and data sent by the second user terminal that are received, as data sent by the user.

In a specific implementation process, after the processing unit 803 determines that the first user terminal and the second user terminal are terminals of the same user the receiving unit 801 is further configured to, receive a sharing request sent by the second user terminal, where the sharing request carries a terminal identifier and the sharing type of the first user terminal, and the sharing type is determined by the second user terminal according to a terminal capability of the first user terminal. The conference server further includes the instruction unit 805 configured to instruct, according to the sharing request received by the receiving unit 801, the first user terminal to perform data sharing specified by the sharing type.

In a specific implementation process, the conference participation request further includes a terminal type of the first user terminal. The sending unit 804 is further configured to send the terminal identifier of the first user terminal and the terminal type of the first user terminal to the second user terminal before the receiving unit 801 receives the sharing request sent by the second user terminal such that the second user terminal determines the terminal capability of the first user terminal according to the terminal type of the first user terminal.

In a specific implementation process, the sending unit 804 is further configured to send the terminal identifier of the first user terminal and the terminal capability of the first user terminal to the second user terminal before the receiving unit 801 receives the sharing request sent by the second user terminal.

In a specific implementation process, the terminal capability of the first user terminal includes a whiteboard sharing capability. The sharing type is determined according to the whiteboard sharing capability, and the sharing type is whiteboard sharing. The instruction unit 805 is further configured to instruct the first user terminal to perform whiteboard sharing.

In a specific implementation process, before receiving the sharing request sent by the second user terminal, the receiving unit 801 is further configured to receive first whiteboard sharing data sent by the second user terminal, send the first whiteboard sharing data to the first user terminal, and send the first whiteboard sharing data to the user terminal of the other user in the conference such that the user terminal of the other user in the conference identifies, according to the description information, the first whiteboard sharing data as whiteboard sharing data sent by the user.

The receiving unit 801 is further configured to receive second whiteboard sharing data sent by the first user terminal after the instruction unit 805 instructs the first user terminal to perform data sharing specified by the sharing type.

The sending unit 804 is further configured to send the second whiteboard sharing data received by the receiving unit 801 to the second user terminal such that the second user terminal displays the first whiteboard sharing data and the second whiteboard sharing data together, and send the second whiteboard sharing data to the user terminal of the other user in the conference such that the user terminal of the other user in the conference displays the first whiteboard sharing data and the second whiteboard sharing data together, and identifies, according to the description information, the whiteboard sharing data displayed together, as whiteboard sharing data sent by the user.

In a specific implementation process, the capability of the first user terminal includes a camera capability. The sharing type is determined according to the camera capability, and the sharing type is video sharing. The instruction unit 805 is further configured to instruct the first user terminal to perform video sharing.

In a specific implementation process, before receiving the sharing request sent by the second user terminal the receiving unit 801 is further configured to receive first video sharing data sent by the second user terminal, send the first video sharing data to the first user terminal, and send the first video sharing data to the user terminal of the other user in the conference such that the user terminal of the other user in the conference identifies, according to the description information, the first video sharing data as video sharing data sent by the user.

The receiving unit 801 is further configured to receive second video sharing data sent by the first user terminal after the instruction unit 805 instructs the first user terminal to perform data sharing specified by the sharing type.

The sending unit 804 is further configured to send the second video sharing data received by the receiving unit 801 to the second user terminal, and send the second video sharing data to the user terminal of the other user in the conference such that the user terminal of the other user in the conference identifies, according to the description information, the second video sharing data as video sharing data sent by the user.

In a third embodiment of the present disclosure, based on a same inventive concept, a conference server is described.

Figure 9:
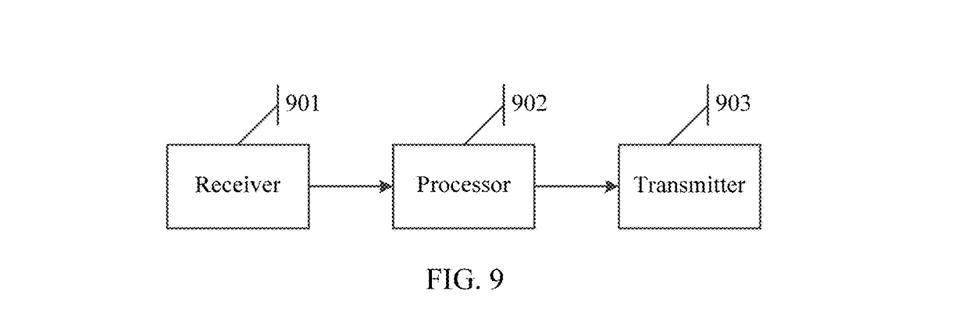
FIG. 9 is another schematic diagram of a conference server according to an embodiment of the present disclosure.

In the following, referring to FIG. 9, the conference server includes a receiver 901, a processor 902, and a transmitter 903.

The following describes specific functions of the functional units.

The receiver 901 is configured to receive a conference participation request sent by a first user terminal, acquire an identity code of a user of the first user terminal from the conference participation request, and involve the first user terminal in a conference.

The processor 902 is configured to compare the identity code received by the receiver 901 with identity codes corresponding to other user terminals that participate in the conference.

The processor 902 is configured to determine that the first user terminal and a second user terminal are terminals of the same user if it is determined, according to a comparison result, that the second user terminal among the other user terminals and the first user terminal correspond to the same identity code.

The transmitter 903 is configured to send description information that is used to indicate that both the first user terminal and the second user terminal belong to the user and that is determined by the processor 902 to a user terminal of another user in the conference such that the user terminal of the other user identifies, according to the description information, both data sent by the first user terminal and data sent by the second user terminal that are received, as data sent by the user.

In a specific implementation process, the receiver 901 is further configured to receive a sharing request sent by the second user terminal after the processor 902 determines that the first user terminal and the second user terminal are terminals of the same user, where the sharing request carries a terminal identifier and the sharing type of the first user terminal, and the sharing type is determined by the second user terminal according to a terminal capability of the first user terminal. The processor 902 is configured to instruct, according to the sharing request received by the receiver 901, the first user terminal to perform data sharing specified by the sharing type.

In a specific implementation process, the conference participation request further includes a terminal type of the first user terminal. The transmitter 903 is further configured to send the terminal identifier of the first user terminal and the terminal type of the first user terminal to the second user terminal before the receiver 901 receives the sharing request sent by the second user terminal such that the second user terminal determines the terminal capability of the first user terminal according to the terminal type of the first user terminal.

In a specific implementation process, the transmitter 903 is further configured to send the terminal identifier of the first user terminal and the terminal capability of the first user terminal to the second user terminal before the receiver 901 receives the sharing request sent by the second user terminal.

In a specific implementation process, the terminal capability of the first user terminal includes a whiteboard sharing capability. The sharing type is determined according to the whiteboard sharing capability, and the sharing type is whiteboard sharing. The processor 902 is further configured to instruct the first user terminal to perform whiteboard sharing.

In a specific implementation process, before receiving the sharing request sent by the second user terminal, the receiver 901 is further configured to receive first whiteboard sharing data sent by the second user terminal, send the first whiteboard sharing data to the first user terminal, and send the first whiteboard sharing data to the user terminal of the other user in the conference such that the user terminal of the other user in the conference identifies, according to the description information, the first whiteboard sharing data as whiteboard sharing data sent by the user.

The receiver 901 is further configured to receive second whiteboard sharing data sent by the first user terminal after the processor 902 instructs the first user terminal to perform data sharing specified by the sharing type.

The transmitter 903 is further configured to send the second whiteboard sharing data received by the receiver 901 to the second user terminal such that the second user terminal displays the first whiteboard sharing data and the second whiteboard sharing data together, and send the second whiteboard sharing data to the user terminal of the other user in the conference such that the user terminal of the other user in the conference displays the first whiteboard sharing data and the second whiteboard sharing data together, and identifies, according to the description information, the whiteboard sharing data displayed together, as whiteboard sharing data sent by the user.

In a specific implementation process, the capability of the first user terminal includes a camera capability. The sharing type is determined according to the camera capability, and the sharing type is video sharing. The processor 902 is further configured to instruct the first user terminal to perform video sharing.

In a specific implementation process, before receiving the sharing request sent by the second user terminal, the receiver 901 is further configured to receive first video sharing data sent by the second user terminal, send the first video sharing data to the first user terminal, and send the first video sharing data to the user terminal of the other user in the conference such that the user terminal of the other user in the conference identifies, according to the description information, the first video sharing data as video sharing data sent by the user.

The receiver 901 is further configured to receive second video sharing data sent by the first user terminal after the processor 902 instructs the first user terminal to perform data sharing specified by the sharing type.

The transmitter 903 is further configured to send the second video sharing data received by the receiver 901 to the second user terminal, and send the second video sharing data to the user terminal of the other user in the conference such that the user terminal of the other user in the conference identifies, according to the description information, the second video sharing data as video sharing data sent by the user.

In a third embodiment of the present disclosure, based on a same inventive concept, a conference system is described.

For a specific architecture of the conference system, refer to FIG. 2, and details are not described again in this embodiment of the present disclosure. The following further describes functions of parts in the conference system.

A first user terminal is configured to send a conference participation request, where the conference participation request carries an identity code of a user of the first user terminal, and a conference server is configured to receive the conference participation request, acquire the identity code of the user of the first user terminal from the conference participation request, and involve the first user terminal in a conference, compare the identity code with identity codes corresponding to other user terminals that participate in the conference, determine that the first user terminal and a second user terminal are terminals of the same user if it is determined, according to a comparison result, that the second user terminal among the other user terminals in the conference and the first user terminal correspond to the same identity code, and send, to a user terminal of another user in the conference, description information used to indicate that both the first user terminal and the second user terminal belong to the user such that the user terminal of the other user in the conference identifies, according to the description information, both data sent by the first user terminal and data sent by the second user terminal that are received, as data sent by the user.

The system further includes the second user terminal configured to send a sharing request after the conference server determines that the first user terminal and the second user terminal are terminals of the same user, where the sharing request carries a terminal identifier and a sharing type of the first user terminal, and the sharing type is determined by the second user terminal according to a terminal capability of the first user terminal, where the conference server is further configured to instruct, according to the sharing request sent by the second user terminal, the first user terminal to perform data sharing specified by the sharing type.

In a specific implementation process, the conference participation request further includes a terminal type of the first user terminal. The conference server is further configured to send the terminal identifier of the first user terminal and the terminal type of the first user terminal to the second user terminal before receiving the sharing request sent by the second user terminal, and the second user terminal is further configured to determine the terminal capability of the first user terminal according to the terminal type of the first user terminal.

In a specific implementation process, the conference participation request further includes the terminal capability of the first user terminal, and the conference server is further configured to send the terminal identifier of the first user terminal and the terminal capability of the first user terminal to the second user terminal before receiving the sharing request sent by the second user terminal.

In a specific implementation process, the terminal capability of the first user terminal includes a whiteboard sharing capability. The sharing type is determined according to the whiteboard sharing capability, and the sharing type is whiteboard sharing, and the conference server is further configured to instruct the first user terminal to perform whiteboard sharing.

In a specific implementation process, the capability of the first user terminal includes a camera capability. The sharing type is determined according to the camera capability, and the sharing type is video sharing, and the conference server is further configured to instruct the first user terminal to perform video sharing.

The following technical effects can be achieved using one or more embodiments of the present disclosure In the embodiments of the present disclosure, an identity code of a first user terminal is acquired first, and then the identity code is compared with identity codes of other user terminals in a conference. It is determined that the first user terminal and a second user terminal are user terminals of a same user if the second user terminal among the other user terminals in the conference and the first user terminal have the same identity code, and description information that "the first user terminal and the second user terminal belong to the same user" is sent to a user terminal of another user in the conference. The user terminal of the other user in the conference can identify the first user terminal and the second user terminal as user terminals used by the same user after receiving the description information. Therefore, in the present disclosure, it is mainly determined that user terminals having a same identity code are user terminals of a same user, and description information that the user terminals having the same identity code belong to the same user is sent to a user terminal of another user in a conference. Therefore, the user terminal of the other user in the conference can identify the user terminals having the same identity code, as user terminals used by the same user.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact-disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the present disclosure without departing from the scope of the present disclosure. The present disclosure is intended to cover these modifications and variations provided that they fall within the scope of protection defined by the following claims and their equivalent technologies.

What is claimed is:

1. A user terminal grouping method, comprising:
   sending, by a first user terminal to a conference server, a conference participation request, wherein the conference participation request carries an identity code of a user of the first user terminal;
   receiving, by the first user terminal from the conference server, a conference participation success message; and
   receiving, by the first user terminal from the conference server, a mapping relationship, wherein the mapping relationship comprises a user name, a quantity of terminals associated with the user name, an identify code associated with the user name, a first terminal identifier associated with the user name, a second terminal identifier associated with the user name, a first terminal type associated with the first terminal identifier, and a second terminal type associated with the second terminal identifier.

2. The user terminal grouping method of claim 1, further comprising receiving, by the first user terminal from the conference server, an instruction to perform data sharing.

3. The user terminal grouping method of claim 2, wherein the instruction indicates for the first user terminal to perform whiteboard sharing.

4. The user terminal grouping method of claim 2, wherein the instruction indicates for the first user terminal to perform video sharing.

5. The user terminal grouping method of claim 3, wherein before receiving the instruction from the conference server, the user terminal grouping method further comprising:
   receiving, by the first user terminal from the conference server, first whiteboard sharing data, wherein the first whiteboard sharing data is from a second user terminal;
   displaying, by the first user terminal on a whiteboard of the first user terminal, the first whiteboard sharing data; and
   performing, by the first user terminal after receiving the instruction from the conference server, whiteboard sharing by sending second whiteboard sharing data to the conference server, wherein the second whiteboard sharing data comprises data edited by the user on the whiteboard of the first user terminal.

6. The user terminal grouping method of claim 4, wherein before receiving the instruction from the conference server, the user terminal grouping method further comprises:
   receiving, by the first user terminal from the conference server, first video sharing data, wherein the first video sharing data is from a second user terminal;
   displaying, by the first user terminal, the first video sharing data; and
   performing, by the first user terminal after receiving the instruction from the conference server, video sharing by sending second video sharing data to the conference server, wherein the second video sharing data is video taken by the first user terminal.

7. An apparatus comprising:
a memory comprising computer-executable instructions; and
a computer processor coupled to the memory and configured to execute the computer-executable instructions, which causes the computer processor to be configured to:
send, by a first user terminal to a conference server, a conference participation request, wherein the conference participation request carries an identity code of a user of the first user terminal;
receive, by the first user terminal from the conference server, a conference participation success message; and
receive, by the first user terminal from the conference server, a mapping relationship, wherein the mapping relationship comprises a user name, a quantity of terminals associated with the user name, an identify code associated with the user name, a first terminal identifier associated with the user name, a second terminal identifier associated with the user name, a first terminal type associated with the first terminal identifier, and a second terminal type associated with the second terminal identifier.

8. The apparatus of claim 7, wherein the computer-executable instructions further cause the computer processor to be configured to receive, by the first user terminal from the conference server, an instruction to perform data sharing.

9. The apparatus of claim 8, wherein the instruction indicates for the first user terminal to perform whiteboard sharing.

10. The apparatus of claim 8, wherein the instruction indicates for the first user terminal to perform video sharing.

11. The apparatus of claim 9, wherein before the computer processor is configured to receive the instruction from the conference server, the computer-executable instructions further cause the computer processor to be configured to:
receive, by the first user terminal from the conference server, first whiteboard sharing data, wherein the first whiteboard sharing data is from a second user terminal;
display, by the first user terminal on a whiteboard of the first user terminal, the first whiteboard sharing data; and
perform, by the first user terminal after receiving the instruction from the conference server, whiteboard sharing by sending second whiteboard sharing data to the conference server, wherein the second whiteboard sharing data comprises data edited by the user on the whiteboard of the first user terminal.

12. The apparatus of claim 10, wherein before the computer processor is configured to receive the instruction from the conference server, the computer-executable instructions further cause the computer processor to be configured to:
receive, by the first user terminal from the conference server, first video sharing data, wherein the first video sharing data is from a second user terminal;
display, by the first user terminal, the first video sharing data; and
perform, by the first user terminal after receiving the instruction from the conference server, video sharing by sending second video sharing data to the conference server, wherein the second video sharing data is video taken by the first user terminal.

13. A computer program product comprising a non-transitory computer readable storage medium storing program code thereon for user terminal grouping, the program code comprising instructions for executing a method that comprises:
sending, by a first user terminal to a conference server, a conference participation request, wherein the conference participation request carries an identity code of a user of the first user terminal;
receiving, by the first user terminal from the conference server, a conference participation success message; and
receiving, by the first user terminal from the conference server, a mapping relationship, wherein the mapping relationship comprises a user name, a quantity of terminals associated with the user name, an identify code associated with the user name, a first terminal identifier associated with the user name, a second terminal identifier associated with the user name, a first terminal type associated with the first terminal identifier, and a second terminal type associated with the second terminal identifier.

14. The computer program product of claim 13, wherein the method further comprises receiving, by the first user terminal from the conference server, an instruction to perform data sharing.

15. The computer program product of claim 14, wherein the instruction indicates for the first user terminal to perform whiteboard sharing.

16. The computer program product of claim 14, wherein the instruction indicates for the first user terminal to perform video sharing.

17. The computer program product of claim 15, wherein the method further comprises:
receiving, by the first user terminal from the conference server, first whiteboard sharing data, wherein the first whiteboard sharing data is from a second user terminal;
displaying, by the first user terminal on a whiteboard of the first user terminal, the first whiteboard sharing data; and
performing, by the first user terminal after receiving the instruction from the conference server, whiteboard sharing by sending second whiteboard sharing data to the conference server, wherein the second whiteboard sharing data comprises data edited by the user on the whiteboard of the first user terminal.

18. The computer program product of claim 16, wherein the method further comprises:
receiving, by the first user terminal from the conference server, first video sharing data, wherein the first video sharing data is from a second user terminal;
displaying, by the first user terminal, the first video sharing data; and
performing, by the first user terminal after receiving the instruction from the conference server, video sharing by sending second video sharing data to the conference server, wherein the second video sharing data is video taken by the first user terminal.

* * * * *

UNITED STATES PATENT AND TRADEMARK OFFICE
CERTIFICATE OF CORRECTION

PATENT NO.        : 10,601,926 B2
APPLICATION NO.   : 15/255751
DATED             : March 24, 2020
INVENTOR(S)       : Yu Yin, Yifeng Ying and Dongxue Shi Page 1 of 1

It is certified that error appears in the above-identified patent and that said Letters Patent is hereby corrected as shown below:

On the Title Page

Page 2, Column 2, Other Publications, Line 5: "14684626.4, Extended European Search" should read "14884626.4, Extended European Search"

Signed and Sealed this
Twelfth Day of May, 2020

Andrei Iancu
*Director of the United States Patent and Trademark Office*